Patented June 29, 1948

2,444,127

UNITED STATES PATENT OFFICE 2,444,127

PROCESS FOR PREPARING ROASTED FOWL

John A. Zublin, Saugus, Calif.

No Drawing. Application December 27, 1945,
Serial No. 637,506

2 Claims. (Cl. 99—107)

The present invention relates to roasted fowls such, for example, as chickens, turkeys, ducks, geese, guineas and the like, which are normally subject to deterioration and putrefaction in a relatively short time.

There exists in this country an urgent demand for pre-roasted fowl that can be quickly heated for serving and consumption which retains its original flavor and appearance. Many families are so fully occupied and inadequately housed that they have neither the time nor the facilities for indulging in the prosaic art of roasting fowls, yet, their appetites for such food are keen.

Attempts have been made to meet this growing demand for roasted fowl, but these attempts have met with little or no success for the reason that, even though the roasting process has developed sufficient heat in the flesh of the fowl to destroy the bacteria therein, the air which subsequently comes in contact with the fowl after the same has been roasted again contaminates the flesh of the fowl with new cultures of bacilli and fungi. It has been ascertained the zone of attack and institution of contamination is on the interior wall of the roasted fowl. Indeed, when a roasted fowl is kept at normal temperature the process of putrefaction invariably starts on the interior walls of the fowl surrounding the central hollow space from which the interior organs of the fowl have been removed. The outer skin of a properly roasted fowl is somewhat seared from the roasting or broiling process and affords a more or less natural coating that is quite resistant to air contamination, far more so than are the unprotected interior walls of the fowl, which have no skin coating and are not seared in the roasting process.

It is, therefore, an object of the present invention to provide a method for protecting the inner walls of a roasted fowl from deterioration by filling the entire void from which the interior organs of the fowl have been removed with an edible thermoplastic, air-excluding and putrefaction-retarding substance.

It is a further object of the invention to greatly facilitate the preparing of roasted fowls in a savory, tasteful, healthful and economic manner for subsequent consumption by persons who do not have the time, the knowledge or the necessary facilities to permit of their preparation of roasted or broiled fowls from the fresh or raw birds in the usually accepted manner.

It is still a further object of the present invention to provide a method which permits of highly economical preparation of putrefaction-resisting roasted fowls permitting their preparation on a large scale at low cost.

The invention may be advantageously practiced in the following manner: Fresh, uncooked fowls are thoroughly cleaned through the removal of all interior organs and conditioned for the roasting process. The cleaned hollow fowl is then subjected to an appropriate roasting operation in a roasting oven which may be advantageously of the electric type. The roasting operation is effected at temperatures which are wholly sterile to bacteria. Immediately upon completion of the roasting operation and before the fowl is permitted to cool to a temperature below that sterile to bacteria, the entire void or hollow space on the interior of the fowl is completely filled with a savory, edible, thermoplastic filler. It is found that an edible, savory, thermoplastic filler can be prepared and introduced into the interior of the fowl while both the fowl and the filler are at an elevated temperature sterile to bacteria. As the fowl cools the thermoplastic edible filler congeals and becomes an integrated part of the roasted fowl product.

While considerable latitude may be allowed in the preparation of the specific thermoplastic filler, it has been found that a filler comprising essentially meat juices, gelatin, grated cooked vegetables, appropriate seasoning and small additions of certain chemical preservatives proves highly satisfactory.

Appropriate chemical preservative agents may be selected from the class consisting of sodium acetate produced by reaction of acetic acid and sodium bicarbonate which may occur in situ in the filler, boracic acid alone or with such other ingredients as gum tragacanth, alum and the like, silicic acid, lactic acid, tartaric acid, meta or para hydroxy benzoic acid esters, and crotonic acid esters and salts.

It will be understood that the hollow hot fowl body is appropriately sealed to prevent undesired leakage of the filler during the filling step. After the hot fowl has been suitably filled with the thermoplastic filler, the entire product is permitted to cool and may be stored at normal or subnormal temperature and will keep for several days. Indeed, it will keep perfectly for a sufficiently long period to permit of ordinary retail distribution.

If desired, the entire roasted fowl, containing the plastic filler, may be packaged in a transparent wrapping and hermetically sealed therein. The roasted fowls thus prepared are easily handled and have an extremely attractive appearance for retail marketing.

All that is necessary to prepare the roasted fowl for serving and consumption is to heat the same to a temperature requisite to melt the thermoplastic filler. This operation may be facilitated through the use of a small quantity of hot water which aids in disintegrating and melting the plastic filler. Since the plastic filler is wholly edible and very savory, it forms a secondary tasty dish more or less in the form of gravy which can be served with the roasted fowl.

It will be observed that the preparation of the precooked, roasted fowl is an extremely simple operation and requires very little time and no extensive facilities or experienced attention.

Through the medium of the present invention it is possible to prepare pre-roasted fowl which retains its natural roasted appearance without change and which is protected from air contamination over prolonged periods. Additionally, the pre-roasted fowl is made readily available for quick service even by those unskilled in the art of cooking and without requiring any such elaborate equipment as is required to effect the complete roasting operation incident to the preparation of a roasted fowl dinner.

The foregoing specification is given by way of exemplification of the invention and not in limitation thereof, the scope of the invention being that of the subjoined claims.

What I claim is:

1. A method for preserving the original, natural, roasted appearance and flavor of a whole pre-roasted fowl and protecting it against flavor deterioration for several days at normal temperature, which comprises filling the entire body cavity only of the eviscerated, whole, seared, undeformed, pre-roasted fowl immediately upon completion of roasting and before the fowl is cooled substantially below roasting temperature with a hot, molten, edible, gelatinous filler, and thereafter cooling the same to congeal the filler, while said fowl and filler are maintained at substantially atmospheric pressure and while preventing egress of the filler from the body cavity until the filler has congealed.

2. A method for preserving the original, natural roasted appearance and flavor of a whole pre-roasted fowl and protecting it against flavor deterioration for several days at normal temperature which comprises filling the entire body cavity only of the eviscerated, whole, seared, undeformed, pre-roasted fowl immediately upon completion of roasting and before the fowl is cooled substantially below roasting temperature with a hot, molten, thermoplastic, air excluding and putrefaction retarding, gelatinous substance, the temperature of said substance being substantially that of the roasted fowl and thereafter cooling the same to congeal the filler while maintaining said fowl and filler at substantially atmospheric pressure and while preventing egress of the filler from the body cavity until the filler has congealed.

JOHN A. ZUBLIN.

REFERENCES CITED

The following references are of record in the file of this patent:

UNITED STATES PATENTS

| Number | Name | Date |
| --- | --- | --- |
| 909,172 | Emmerich | Jan. 12, 1909 |
| 1,740,176 | Hormel et al. | Dec. 17, 1929 |
| 2,231,886 | Crider | Feb. 18, 1941 |
| 2,374,452 | Noyes | Apr. 24, 1945 |

FOREIGN PATENTS

| Number | Country | Date |
| --- | --- | --- |
| 442,644 | Great Britain | Feb. 12, 1936 |

OTHER REFERENCES

"Everybody's Cook Book," 1924, by I. E. Lord, first edition, pub. by Henry Holt and Company, page 621.